United States Patent Office 3,086,893
Patented Apr. 23, 1963

3,086,893
ROSIN AND BROMONATED DIPHENOLIC ACID FLUX
Otto Konig, Forest Hills, N.Y., assignor to National Lead Company, New York, N.Y., a corporation of New Jersey
No Drawing. Filed Oct. 20, 1960, Ser. No. 63,716
5 Claims. (Cl. 148—23)

This invention relates to a soldering flux and more particularly to a rosin flux without corrosive after effects.

It is well known that the chemically active fluxes commonly and effectively used in joining oxidized and dirty metal surfaces are corrosive in nature. All such fluxes are barred from use in the electrical and electronic industries because of corrosive residues which remain in and around soldered joints, and a rosin flux is generally used in electrical work.

Rosin does not leave a corrosive residue but unfortunately has poor fluxing efficiency in that it is not as effective in cleaning surfaces or in promoting the flow of solder. For these reasons attempts have been made to improve its fluxing action by the addition of various activators. These activators have generally been organic base halide salts, amine hydrochlorides and other ionic salt type compounds, and, while fluxing activity of the rosin was improved, corrosive after effects remain due to hydrolysis of residues in moist air. Ionically activated rosin fluxes will not usually meet the rigid requirements established for rosin fluxes to be used in electrical work, as described in Federal Specification QQ–S–571C. Furthermore many of the organic base halides decomposed to produce noxious or toxic fumes.

The object of this invention is to provide a non-corrosive rosin flux with improved flow characteristics. Another object is to provide a flux whose water extract has very low electrical conductivity. A further object is to combine these advantages with the absence of unpleasant or toxic fumes.

Other objects and advantages will become apparent from the following more complete description and claims.

Broadly this invention contemplates a non-corrosive soldering flux comprising rosin and bromonated diphenolic acid.

In a particularly desirable embodiment, this invention contemplates a non-corrosive soldering flux comprising rosin and tetrabromo diphenolic acid, said tetrabromo diphenolic acid being present from about 0.1% to about 5% by weight based on the rosin.

The activator contained in the rosin of the present invention, namely tetrabromo diphenolic acid, 4,4′bis(3,5, dibromo - 4 - hydroxyphenyl) pentanoic acid, possesses bromine combined on the ring of the organic compound. In this type of compound the halogen atoms are non-ionically bonded to the ring replacing hydrogen and therefore will not readily break down and hydrolyze to form corrosive halides.

The diphenolic acid to be effective as an activator may not only be tetrabrominated but may also be of greater or lesser degree of bromination such as nonobromo, dibromo, tribromo, pentabromo, etc.

The incorporation of the tetrabromo diphenolic acid into rosin is facilitated by the addition of a small amount of plasticizer such as turpentine, or by first making an alcoholic solution of rosin, depending on whether a solid plastic flux or a liquid flux is desired. Less than 0.1% of the activator is ineffective while more than 5% is unnecessary by weight of the rosin, to accomplish the results desired.

The following description is offered as an example of the manner of producing the product of this invention.

91.5 grams of pure water white rosin were heated with 7.5 grams of turpentine and stirred until molten. Then, 1 gram of tetrabromo diphenolic acid was stirred in until dissolved. The product had good flux consistency.

Similarly mixtures were made 0.5 gram and 2.0 grams of tetrabromo diphenolic acid.

Also a 50% rosin in alcohol solution was made and 0.5%, 1.0% and 2.0% by weight of tetrabromo diphenolic acid was added respectively to form 3 liquid fluxes with varying proportions of activator.

The above 6 samples of fluxes together with pure rosin, were then tested in the various tests described in Specification QQ–S–571C. Firstly, their respective spreading characteristics on 1½″ x 1½″ squares of copper in comparison to pure rosin all showed no spattering, and at least twice the flow area of pure rosin. Subsequent exposures of the copper squares to 100% humidity at 100° C. for 240 hours showed no corrosive effects on any of the samples. The effects of the fluxes on electrically polarized fine copper wire were also negligible as far as corrosion was concerned.

In the following table, resistivity measurements of water extracts are shown, wherein deionized water with a resistivity of 1,000,000 ohms was used in the manner described in QQ–S–571C.

| 0.05 rosin flux plus tetrabromo diphenolic acid, percent by weight: | Resistivity, ohm cm. |
|---|---|
| None | 500,000 |
| 0.5 Solid | 500,000 |
| 1.0 Solid | 460,000 |
| 2.0 Solid | 220,000 |
| 0.5 Liquid | 500,000 |
| 1.0 Liquid | 470,000 |
| 2.0 Liquid | 200,000 |

In the above test the solid flux contained about 7.5% turpentine while the liquid flux was a 50% alcoholic rosin solution. A resistivity of 100,000 or more is satisfactory according to the Federal Specification cited, which is widely accepted and adhered to by various U.S. Government agencies, particularly the Signal Corps, as well as the electronic industry.

Conventional ionically activated rosin fluxes will generally have resistivities of up to between 50,000 and 100,000 ohms, provided a small enough proportion of activator is used. Usually such small proportions convey little fluxing activity, while larger amounts with better spreading powers, will drop resistivities to very low and unsatisfactory values.

The activated flux of this invention combines in an unusual manner, the absence of any corrosive after effects as exemplified by very high resistivities and good spreading characteristics which are greatly improved in comparision to pure rosin. Further, no noxious or toxic fumes were detected.

While this invention has been described and illustrated by certain specific embodiments, it is not intended to be limited thereto, and other modifications and variations may be employed within the scope of the following claims.

I claim:

1. A non-corrosive solder flux composition, the active flux component of which consists essentially of rosin and brominated diphenolic acid, the brominated diphenolic acid being present in amount at least about 0.1% based on the flux not including the amount of brominated diphenolic acid.

2. A non-corrosive solder flux composition, the active flux component of which consists essentially of rosin and tetrabromo diphenolic acid, said tetrabromo diphenolic acid being present in amount at least about 0.1% based on the flux not including the amount of tetrabromo diphenolic acid.

3. A non-corrosive solder flux, the active flux component of which consists essentially of rosin, a brominated diphenolic acid and a plasticizer, said brominated diphenolic acid being present in amount at least about 0.1% based on the flux not including the brominated diphenolic acid.

4. A non-corrosive solder flux, the active flux component of which consists essentially of rosin, a brominated diphenolic acid and an alcohol, said brominated diphenolic acid being present in amount at least about 0.1% based on the flux not including the brominated diphenolic acid.

5. A non-corrosive solder flux composition, the active flux component of which consists essentially of rosin and tetrabromo diphenolic acid, said tetrabromo diphenolic acid being present in amounts from about 0.1% to about 5% by weight based on the flux not including the tetrabromo diphenolic acid.

References Cited in the file of this patent
UNITED STATES PATENTS
2,626,881   Schoenfeld _____ Jan. 27, 1953